United States Patent [19]

Burton et al.

[11] Patent Number: 5,512,024
[45] Date of Patent: Apr. 30, 1996

[54] APPARATUS FOR DAMPING SHUNT

[75] Inventors: Anthony Burton; Andrew J. S. Williams, both of West Midlands; Andrew J. Kirk, Birmingham; Russell W. Jones, Stratford-upon-Avon, all of England

[73] Assignee: Lucas Industries, West Midlands, England

[21] Appl. No.: 138,337

[22] Filed: Oct. 18, 1993

[30] Foreign Application Priority Data

Oct. 27, 1992 [GB] United Kingdom .................. 9222515

[51] Int. Cl.$^6$ .................................................. B60K 41/04
[52] U.S. Cl. ........................................ 477/102; 364/424.1
[58] Field of Search ................................... 477/101, 102, 477/109, 111

[56] References Cited

U.S. PATENT DOCUMENTS

| | | | |
|---|---|---|---|
| 4,596,217 | 6/1986 | Bonitz et al. | 123/425 |
| 4,630,583 | 12/1986 | Suzuki et al. | 123/425 |
| 4,792,902 | 12/1988 | Hrovat et al. | 364/424.1 |

Primary Examiner—Dirk Wright
Assistant Examiner—Sherry Estremsky
Attorney, Agent, or Firm—Trexler, Bushnell, Giangiorgi & Blackstone, Ltd.

[57] ABSTRACT

Shunt results from drive line resonance of a vehicle's transmission superimposing cyclic oscillations onto the speed of the vehicle's engine. A feedback loop comprising at least one of a band pass filter having a high frequency cut-off characteristic greater than first order, a feedback loop in which the loop gain is a function of transmission ratio, and a non-linear transfer element arranged to have a gain whose magnitude increases with the magnitude of the input to the non-linear transfer element. Additionally shunt may also be controlled by a feed-forward controller based on an engine demand signal.

24 Claims, 7 Drawing Sheets

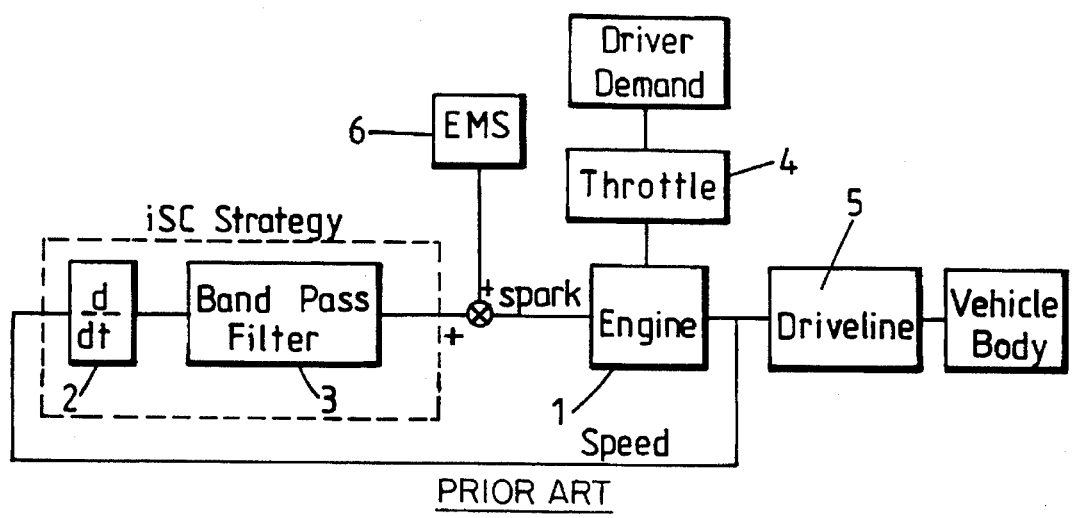
PRIOR ART
FIG. I.
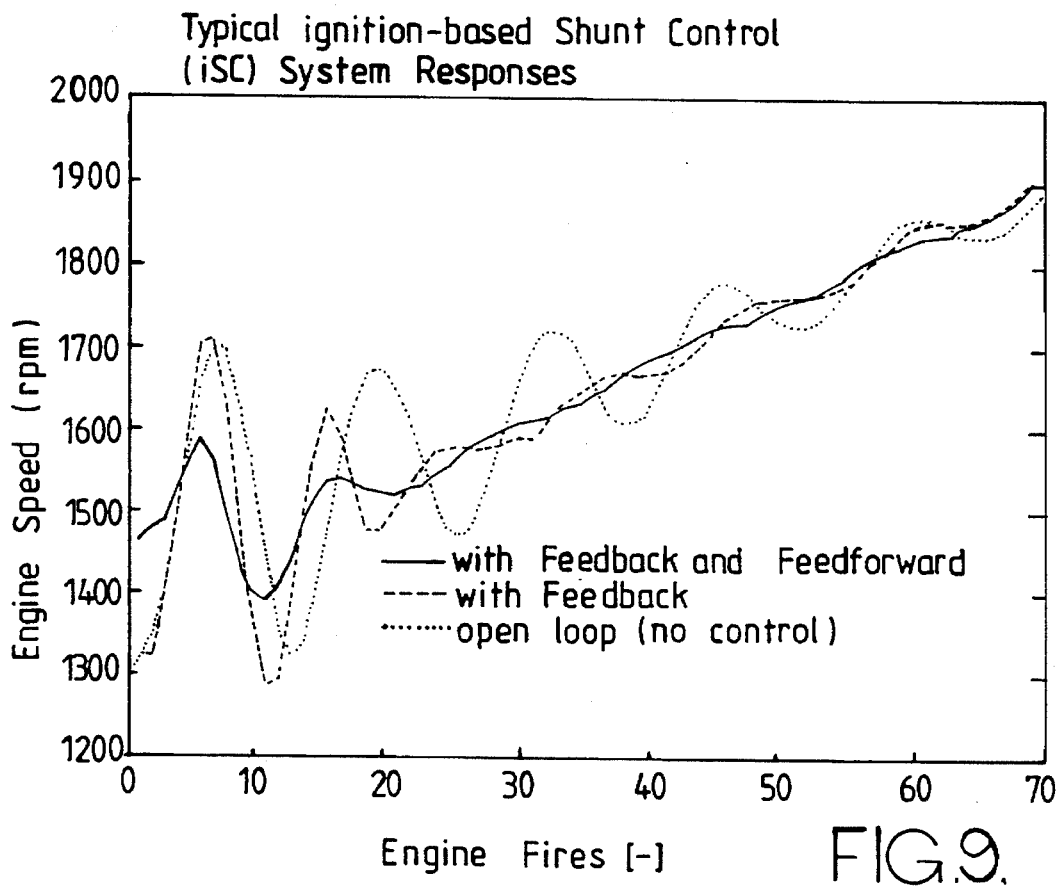
FIG. 9.

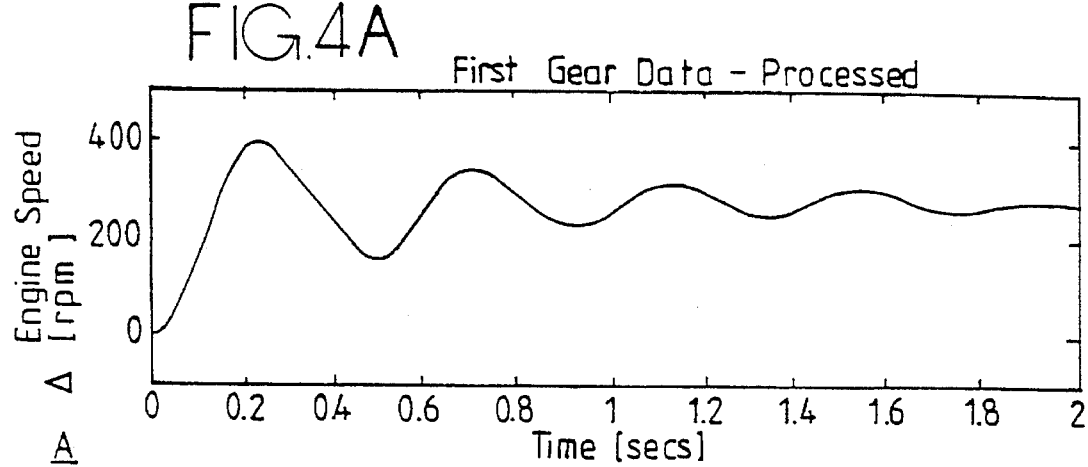
FIG.4A First Gear Data - Processed
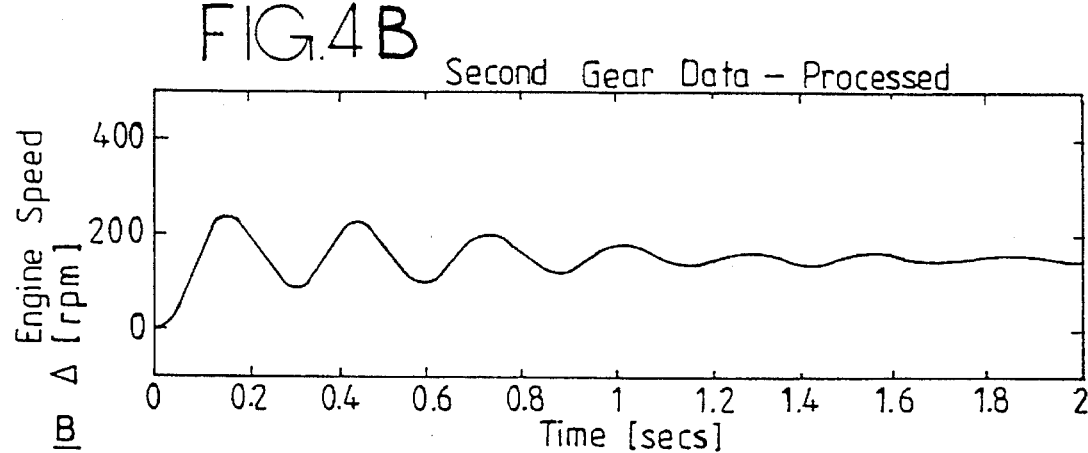
FIG.4B Second Gear Data - Processed
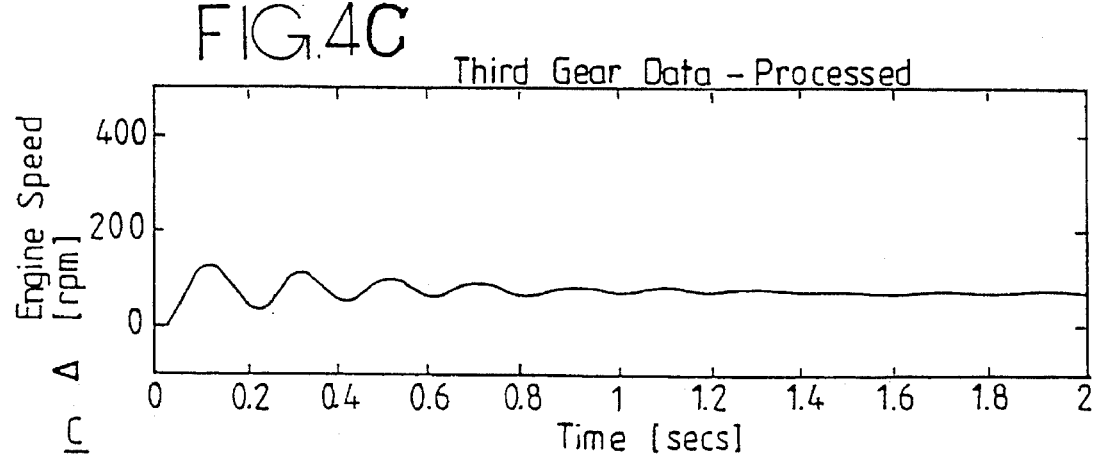
FIG.4C Third Gear Data - Processed

PRIOR ART

APPARATUS FOR DAMPING SHUNT

The present invention relates to an apparatus for damping shunt. Shunt is the term used to describe mechanical resonance phenomenon in vehicle transmissions or drive lines. There are numerous ways in which shunt may occur during driving, for example, rapid throttle movements, gear changes and road surface irregularities. The main observable result of shunt is superimposed cyclic oscillations on the engine, driveline and vehicle speeds, which may feel uncomfortable to the driver.

According to a first aspect of the present invention, there is provided an apparatus for damping shunt of a vehicle powered by an engine, comprising a feedback control loop for controlling engine power output, the feedback control loop comprising a differentiator and a band pass filter having a high frequency cut-off characteristic greater than first order.

Preferably the engine is an internal combustion engine. The engine output power may be controlled by varying the ignition timing.

Preferably the high frequency cut-off is a second order cut-off. The low frequency cut-off of the band pass filter may be a first order response.

Advantageously the centre frequency or pass band of the band pass filter may vary with transmission ratio. The Q (quality factor) of the band pass filter may vary with engine speed and/or transmission ratio.

Preferably the feedback loop is responsive to engine speed. Preferably a moving average filter is provided for forming a moving average of the engine speed. In a sampled data system, the moving average filter may form an average of the N most recent speed measurements. Preferably an output of the moving average filter is provided to an input of the differentiator. Advantageously N is 4 for a 4 cylinder internal combustion engine. N may equal the number of cylinders of the internal combustion engine. The moving average filter may be arranged to provide a notch in the frequency spectrum of the engine speed signal.

Preferably the band pass filter is implemented as a digital filter. Advantageously the sampling rate of the digital filter is related to engine speed. The sampling rate may equal the firing (ignition) rate of the internal combustion engine. Preferably the filter parameters vary with engine speed. Thus the filter may be arranged to have a constant frequency response with changing engine speed.

According to a second aspect of the present invention, there is provided an apparatus for damping shunt of a vehicle powered by an engine via a transmission having at least first and second transmission ratios, comprising a feedback loop for controlling engine power output, the feedback loop comprising a differentiator and having a loop gain as a function of the transmission ratio.

Advantageously the loop gain may vary with engine speed. The values of loop gain may be held in a table addressed by engine speed and transmission ratio or engine speed and gear selected.

Preferably the engine is an internal combustion engine. The engine output power may be controlled by varying the ignition timing. Preferably the feedback loop is responsive to engine speed.

Advantageously a shunt controller may combine the first and second aspects of the present invention.

According to a third aspect of the present invention there is provided an apparatus for damping shunt of a vehicle powered by an engine, comprising a feedback loop for controlling engine output power, the feedback loop comprising a differentiator and a non-linear transfer element arranged such that for a first input value a gradient of an output is a first gradient value and for a second input value the gradient of the output is a second gradient value, the magnitude of the first gradient value being smaller than the magnitude of the second gradient value when the magnitude of the first input value is less than the magnitude of the second input value, and both gradient values being non-zero.

Preferably the engine is an internal combustion engine. The engine output power may be controlled by varying the ignition timing. Preferably the feedback loop is responsive to engine speed. Preferably the input value equals the output value at a maximum permissible level of spark advance.

Preferably the non-linear element has a quadratic transfer function. Advantageously the non-linear element is embodied by a data processor.

Advantageously the third aspect of the invention may be combined with either or both of the first and second aspects of the present invention.

According to a fourth aspect of the present invention, there is provided an apparatus for damping shunt of a vehicle powered by an engine, comprising a filter arranged to attenuate signals below a first frequency for filtering an engine demand signal and means for controlling engine output power in response to an output of the filter.

Preferably the engine is an internal combustion engine. The engine output power may be controlled by varying the ignition timing.

Preferably the engine demand is throttle position of the internal combustion engine. Alternatively accelerator pedal position may be used as the engine demand. As a further alternative manifold pressure may be used as the engine demand.

Preferably the filter is a band pass filter.

The time constant of the filter may be a function of transmission ratio and/or engine speed.

Advantageously the vehicle has a transmission and the output of the filter may be subjected to a variable gain dependent on transmission ratio.

The fourth aspect of the present invention may be combined with any one, any two or all three of the first, second and third aspects of the present invention.

According to a fifth aspect of the present invention, there is provided an apparatus for damping shunt in a vehicle powered by an engine via a transmission, comprising an amplifier for amplifying an engine demand signal and means for controlling engine output power in response to an output of the amplifier, the gain of the amplifier being dependent on transmission ratio.

Preferably a band pass filter is provided for filtering the engine demand signal.

Preferably the engine is an internal combustion engine. The engine output power may be controlled by varying the ignition timing.

The fifth aspect of the present invention may be combined with any one, any two, any three or all four of the first to fourth aspects of the present invention.

Preferably output limiting is provided to limit the magnitude of the change in engine output power or ignition timing required by any one or any combination of the first to fifth aspects of the present invention.

The present invention will further be described, by way of example, with reference to the accompanying drawings, in which:

FIG. 1 is a block diagram of a known shunt controller;

FIGS. 4a to 4b are graphs showing changes in engine speed occurring as a result of shunt;

FIG. 9 is a comparison of engine speed responses with differing shunt control systems;

Figure 2:
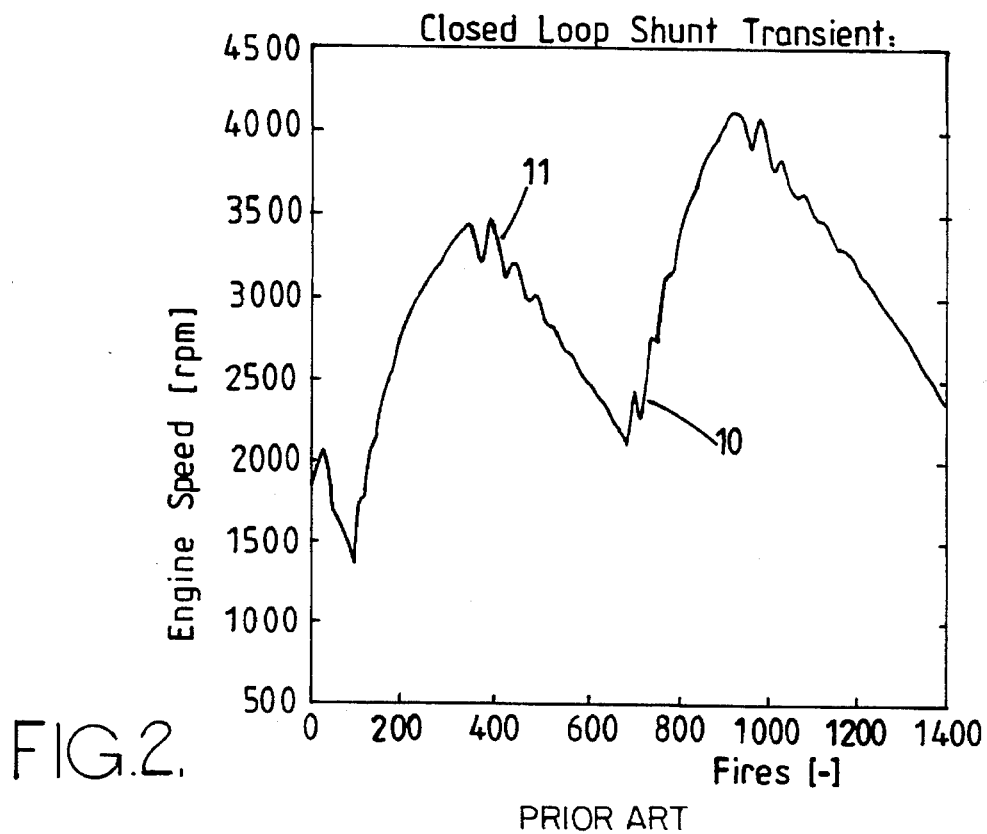
FIG. 2 is a graph showing the performance of the known shunt controller of FIG. 1 under experimental conditions.

The known shunt damping apparatus of FIG. 1 acts to reduce the effects of shunt by controlling engine output power. The speed of an engine 1 is measured by a transducer (not shown) and supplied to an input of a differentiator 2. An output of the differentiator 2 is supplied to an input of a band pass filter 3. The output of the band pass filter 3 is added to a signal representing spark angle supplied, for example, from an engine management system 6.

Shunt control via correction of the engine ignition timing provides rapid control of engine output power. Long term control of engine output power is performed by an engine throttle 4. The output of the engine is transmitted to the driven wheels of the vehicle (not shown) via a transmission 5. The transmission may comprise gears which may experience backlash. The transmission may also comprise members which may be reversibly deformed by the forces acting there on. Thus the transmission may experience resonance or shunt as a result of variations in engine power output or changing forces acting on the wheels, for example, due to driving over a rough road.

FIGS. 4a to 4c illustrate changes in engine speed occurring as a result of shunt in a vehicle without any shunt correction or shunt suppression apparatus. The frequency of the resonance varies with transmission ratio. FIG. 4a shows the resonance when first gear is selected, the resonance occurring at about 2.2Hz. The resonant frequency increases as higher gears are selected. The decay time of the resonance also changes with transmission ratio, the oscillations decaying more rapidly in third gear than in first gear.

FIG. 2 shows the response of a vehicle fitted with the shunt controller of FIG. 1. The controller had a loop gain of 0.02 and the band pass filter had first order filters having cut-off frequencies of 1Hz and 5Hz.

The output of the controller was limited so that it could not change the spark angle by more than ±20°. The vehicle was accelerated and decelerated. Oscillation 10 was observed during acceleration, and a more pronounced oscillation 11 was observed during vehicle deceleration.

Figure 3:
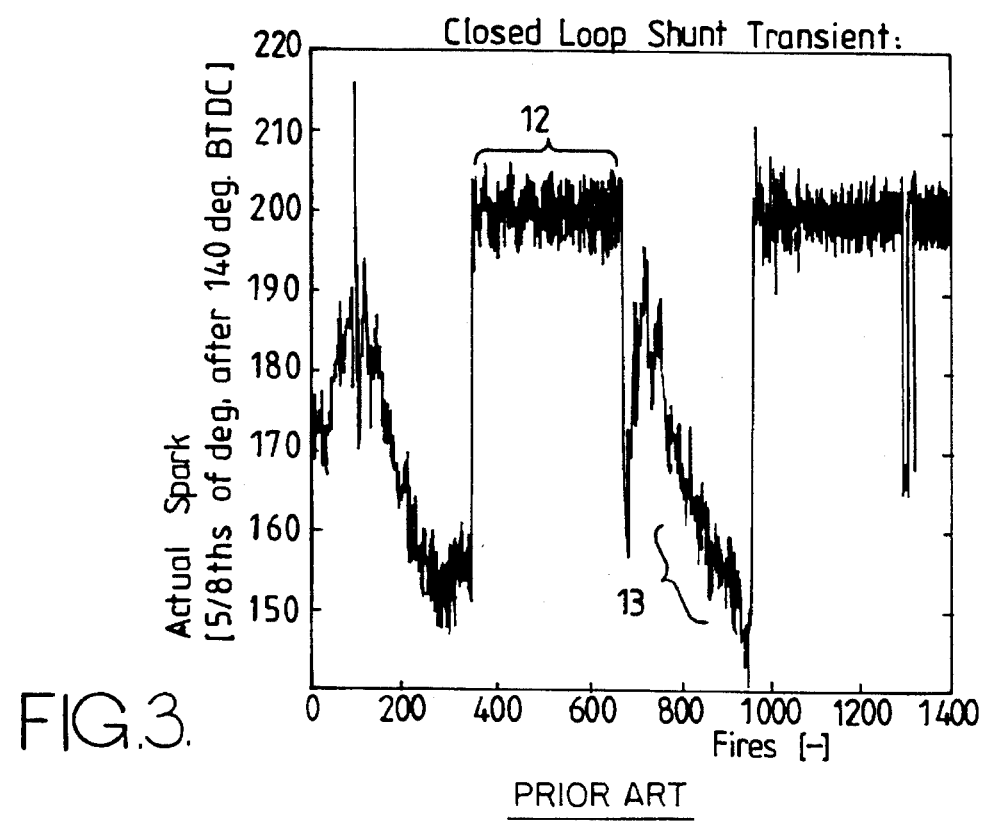
FIG. 3 is a graph showing spark ignition timing in terms of angle before top dead centre for an engine controlled by the known shunt controller.
Figure 5A:
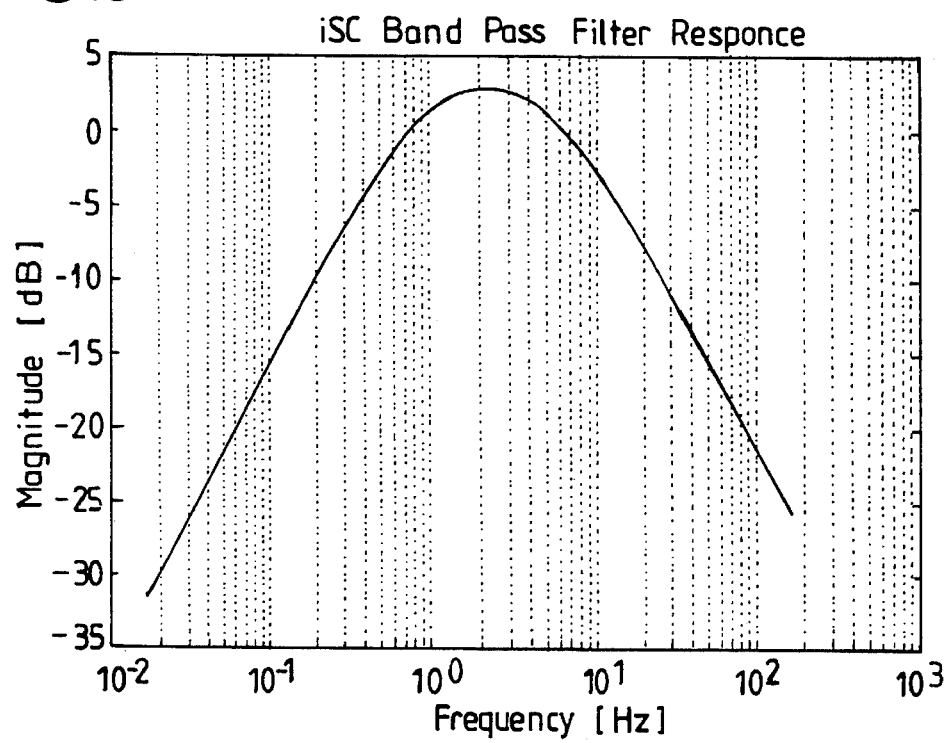
FIGS. 5a and 5b show the band pass filter amplitude-frequency characteristic and the amplitude-frequency characteristic of the band pass filter in combination with a differentiator, respectively, of the known shunt controller of FIG. 1.
Figure 5B:
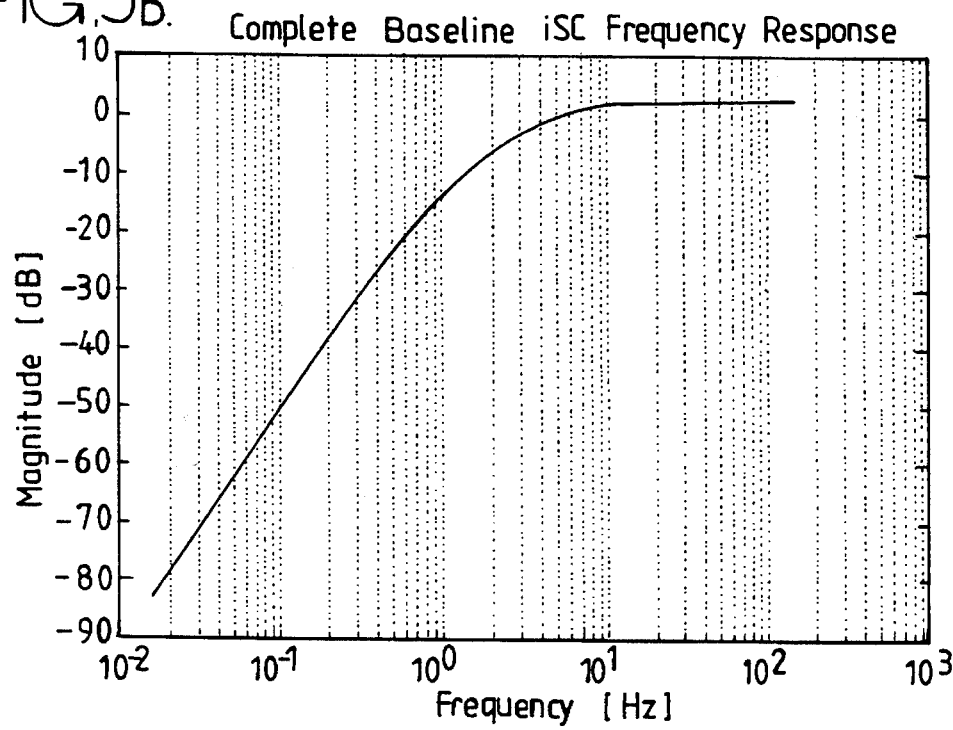

FIG. 3 shows the spark angle during the period of control shown in FIG. 2. Rapid changes of the spark angle are observed, indicated generally as 12 and 13. Such changes may have an adverse effect on vehicle fuel economy and exhaust emissions. Furthermore, attempts to reduce the observed shunt by varying the filter time constants and/or by increasing the control loop gain resulted in an unstable control action. The instability arises because the combination of a band pass filter 3 having a first order high frequency cut off, as illustrated in FIG. 5a, and a differentiator 2 has the frequency response shown in FIG. 5b. High frequency components are not attenuated and can give rise to instability.

Figure 6:
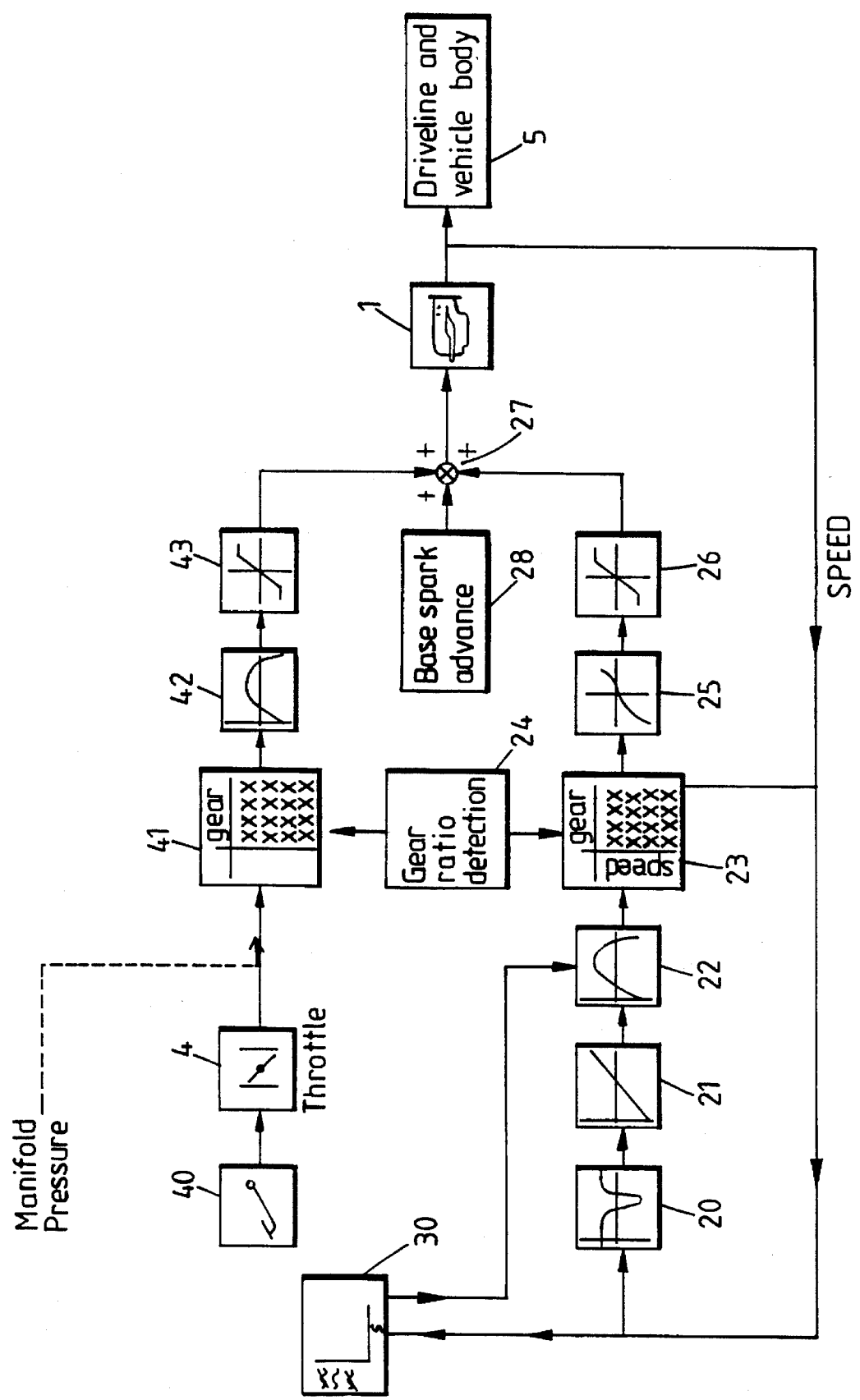
FIG. 6 shows a shunt controller constituting an embodiment of the first to fifth aspects of the present invention.

The shunt controller of FIG. 6 embodies all of the aspects of the present invention. A transducer (not shown) produces a speed signal indicating the speed of the engine 1. The speed signal is supplied to an input of a moving average filter 20. An output of the filter 20 is connected to an input of a differentiator 21. An output of the differentiator 21 is connected to an input of a band pass filter 22. The band pass filter 22 has a high frequency cut-off characteristic that is greater than first order (i.e. it has a frequency cut-off characteristic of greater than 20 dB per decade). An output of the band pass filter 22 is provided to an input of a variable gain cell 23. The cell 23 also receives inputs representing engine speed and transmission ratio. The transmission ratio may be determined by a switch 24 detecting the position of a gear selector stick or by a switch or switches included within an automatic transmission gearbox. An output of the variable gain cell 23 is connected to an input of a non-linear transfer element 25. An output of the element 25 is provided to an input of a limiter 26, an output of which is provided to a first input of a summer 27. A base spark advance signal, supplied by a engine management system 28, is provided to a second input of the summer 27. A filter controller 30 receives the engine speed signal and supplies speed corrected filter constants to the band pass filter 22. Thus far, only the elements of a feedback shunt controller have been described.

The output of the speed transducer (not shown) is averaged by the moving average filter 20 before being supplied to the differentiator 21. The inclusion of the moving average filter 20 makes the feedback shunt controller less responsive to cylinder variability (the variation in combustion characteristics between different cylinders of an engine).

Figure 7:
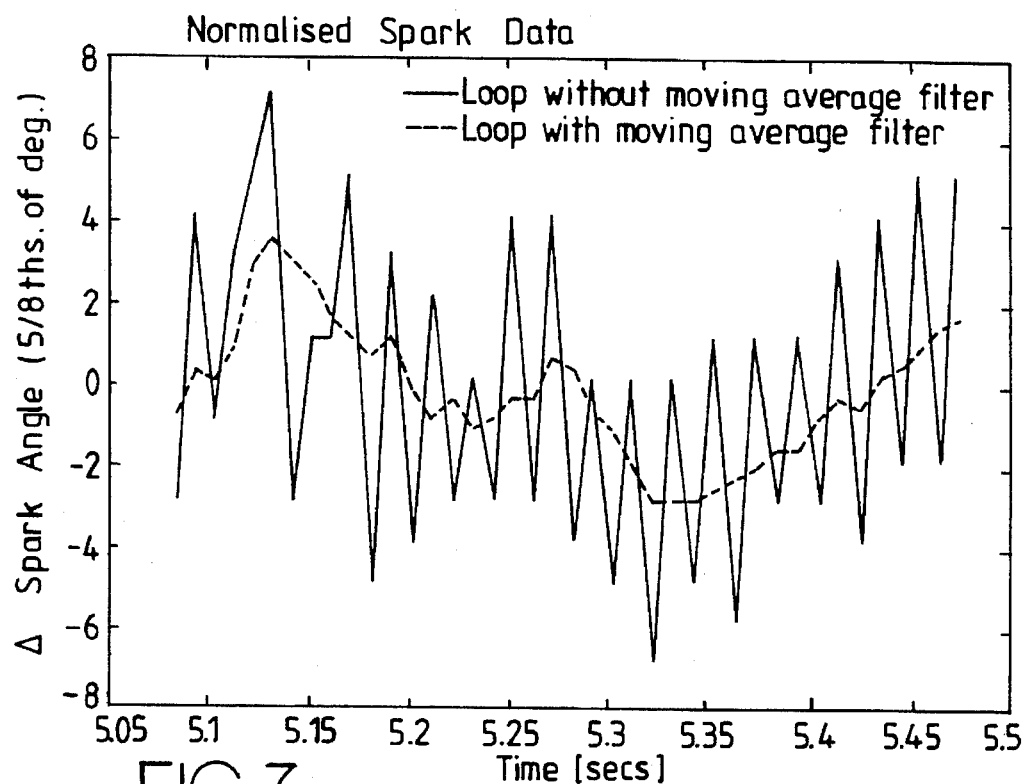
FIG. 7 is a graph showing the result of including a moving average filter in the shunt controller of FIG. 6.

FIG. 7 illustrates the changes in spark angle as controlled by the closed loop controller 21–27 of FIG. 6 with the moving average filter 20, as shown by the chain line, and without the moving average filter 20, as shown by the solid line. The high frequency variation of the spark angle is greatly reduced by the inclusion of the moving average filter, and the engine can also be expected to have cleaner exhaust emissions.

Figure 10A:
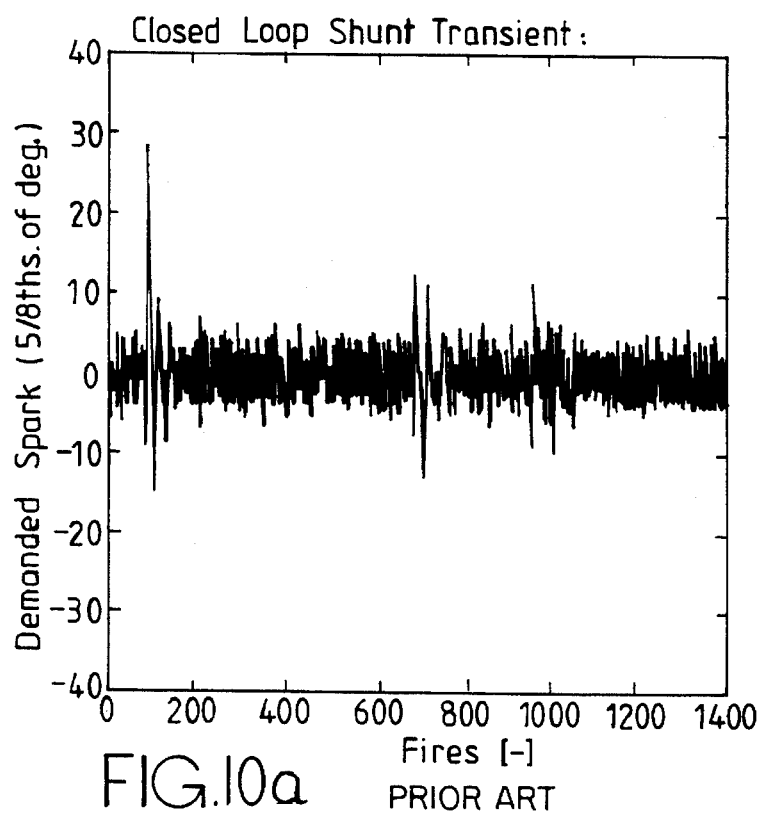
FIG. 10a shows the demanded spark signal at the output of the known shunt controller.
Figure 10B:
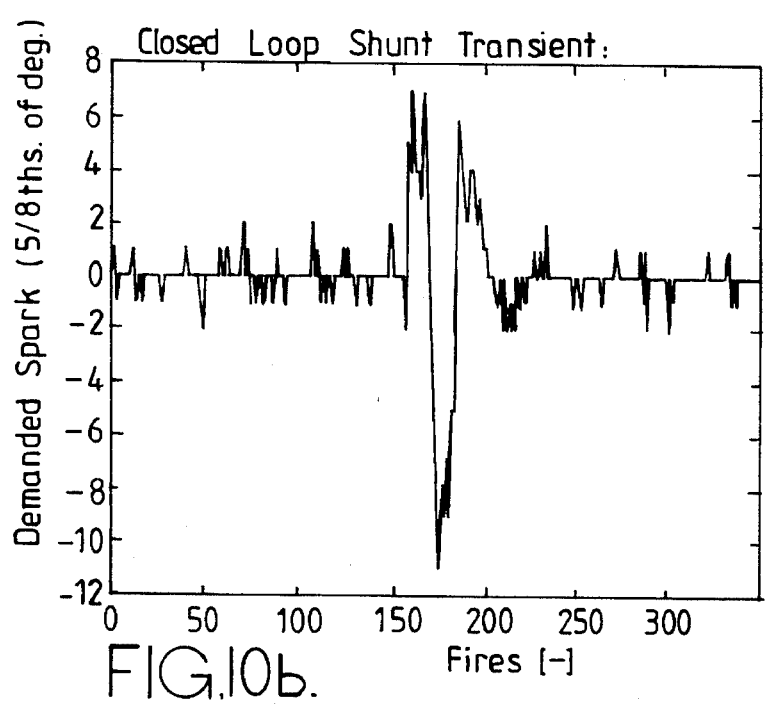
FIG. 10b shows the demanded spark signal at the output of the shunt controller of FIG. 6 without the non-linear element transfer function 25 and the feed forward elements 41 to 43.

FIG. 10a shows the demanded spark signal at the output of the known shunt controller (of FIG. 1), while FIG. 10b shows the demanded spark signal from the controller like the one of FIG. 6 with elements 25 and 40–43 omitted. A transient giving rise to shunt occurs between firings 600–1000 of FIG. 10a. A similar transient occurs after firing 150 of FIG. 10b. The amplitudes of the low frequency peaks due to the shunt controllers' responses to the shunts resulting from the transients are similar. However the output of the shunt controller of the present invention is greatly improved under "no shunt" conditions compared with the known controller. The performance of a controller when no shunt is occurring is as important as its performance during shunt. The controller of the present invention has intermittent variations of 0.5° to 1°, while the known controller exhibits persistent jitter of 3°.

Variations in spark angle during "no shunt" conditions are significantly smaller than variations occurring during shunt control. In order to obtain a further improved "no shunt" response, it is desirable to further reduce the closed loop gain of the shunt controller under "no shunt" conditions. The non-linear transfer element 25 provides an amplitude dependent gain adjustment.

Figure 8:
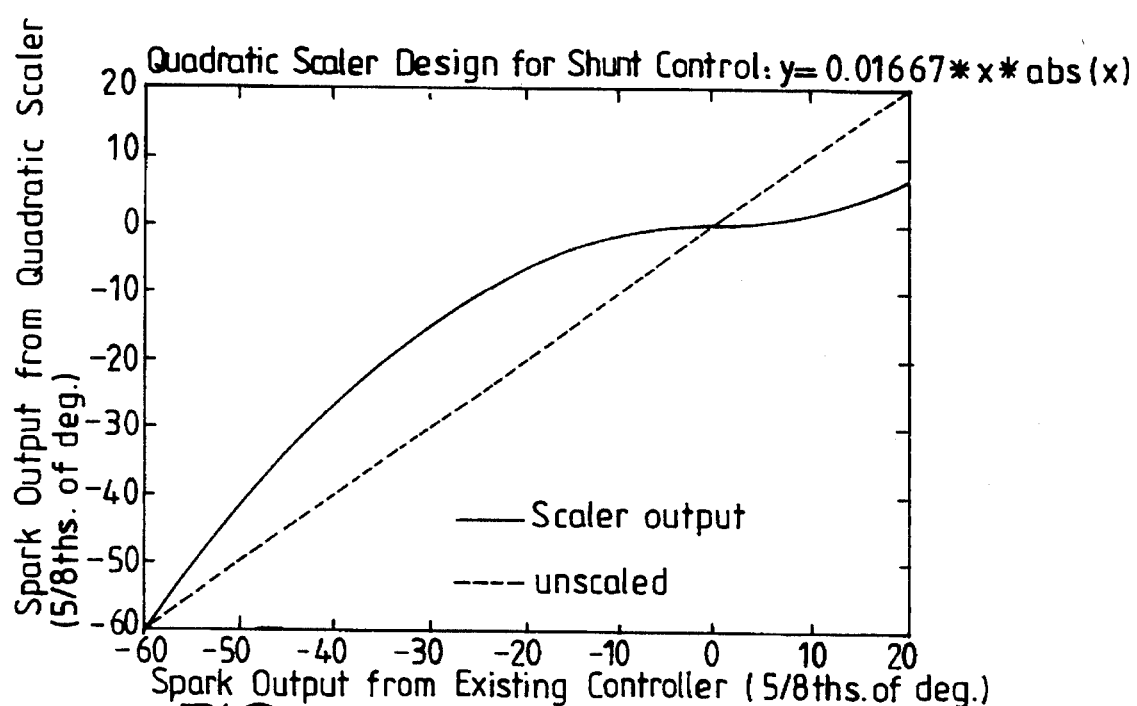
FIG. 8 is a graph of the transfer function of the quadratic scaler of FIG. 6.

FIG. 8 shows an example transfer function of the non-linear transfer element 25. The effects of small spark angle variations occurring during "no shunt" conditions are further suppressed. However larger spark angle changes, which are more likely to arise during shunt control, are increasingly less attenuated as their magnitude increases. The quadratic scaling function can be represented as:

$$Y = A \cdot x \cdot Abs(x)$$

where

Y=output, x=input, and

Abs(x)=absolute value of x.

Such a function has the advantage that it can easily be implemented within a programable data processor and is quick to execute.

FIG. 9 shows a comparison of engine speeds for a vehicle with no shunt control, as indicated by the chain-dot line, and a vehicle having a feedback shunt control comprising elements 20 to 30 of FIG. 6, as indicated by the chain-dash line. The initial response to shunt is roughly equivalent in the uncorrected and corrected vehicles. However, the oscillatory speed variations are rapidly damped out by the shunt controller and acceptable speed stability is obtained near the 20th firing of the engine. Significant speed variations are still occurring at the 70th engine firing in the uncorrected vehicle.

The initial response to shunt can be further improved by the addition of a feed-forward controller comprising elements 41 to 43 to the shunt controller of FIG. 6.

Large changes in engine output power tend to give rise to shunt. The changes are often in response to actuation of the throttle 4 by a part 40 of an engine management system in response to driver demand. It is possible to estimate the amount of shunt likely to be caused by actuation of the throttle and to act to correct it.

A transducer (not shown) measures the position of the throttle. The transducer may form part of a "drive by wire" system fitted to the vehicle. The throttle position signal is supplied as an input to a second variable gain cell 41. Alternatively the gain may receive an input indicative of engine manifold pressure, as indicated by the chain line in FIG. 6, since this is related to driver demand. The gain of the cell 41 is a function of transmission ratio. The cell 41 receives an input representing transmission ratio from the switch 24. The gain of the cell 41 may also be a function of engine speed. An output of the cell 41 is supplied to an input of a filter 42 having at least a high pass function over a first range of frequencies and better still, a band pass response. An output of the filter 42 is passed through a limiter and is then supplied to a third input of the summer 27.

The filter 42 removes the steady and slowly changing components of the throttle position signal. Thus to some extent the filter 42 is acting as a differentiator.

The action of the feed forward control in combination with the feed back controller is illustrated by the solid line of FIG. 9. The magnitude of the initial speed change is reduced by the feed forward controller. This in turn reduces the severity of the shunt that has to be compensated for by the feed back controller. Thus the magnitude and duration of the shunt are significantly reduced by the use of the shunt controller of FIG. 6.

It is thus possible to improve the drivability of a vehicle and to provide a smoother ride.

We claim:

1. An apparatus for damping shunt of a vehicle powered by an engine, comprising a differentiator and a band pass filter arranged in a feedback loop for controlling engine power output, said band pass filter having a high frequency cut-off characteristic greater than first order.

2. An apparatus as claimed in claim 1, in which the engine is an internal combustion engine and the power output is controlled by varying an ignition timing of the engine.

3. An apparatus as claimed in claim 1, in which said band pass filter has a second order high frequency cut-off.

4. An apparatus as claimed in claim 1, in which the vehicle has a transmission and in which said band pass filter has a centre frequency and a pass band, and in which at least one of the centre frequency and the pass band is a function of transmission ratio.

5. An apparatus as claimed in claim 1, in which the vehicle has a transmission and in which said band pass filter has a quality factor which is a function of at least one of engine speed and transmission ratio.

6. An apparatus as claimed in claim 1, in which said feedback loop is responsive to engine speed.

7. An apparatus as claimed in claim 6, further comprising a moving average filter for forming an average of N most recent measurements of engine speed.

8. An apparatus for damping shunt of a vehicle powered by an engine, comprising a differentiator, a band pass filter arranged in a feedback loop for controlling engine power output, said band pass filter having a high frequency cut-off characteristic greater than first order, said feedback loop being responsive to engine speed, and a moving average filter for forming an average of N most recent measurements of engine speed, said moving average filter is arranged to provide a notch in a frequency spectrum of an engine speed signal.

9. An apparatus as claimed in claim 1, in which said band pass filter is implemented as a digital filter and the sampling rate of said filter is related to engine speed.

10. An apparatus for damping shunt in vehicle powered by an engine via a transmission having at least first and second transmission ratios, said apparatus comprising a differentiator within a feedback loop for controlling engine power output, said feedback loop having a loop gain as a function of the transmission ratio.

11. An apparatus for damping shunt in vehicle powered by an engine via a transmission having at least first and second transmission ratios, said apparatus comprising a differentiator within a feedback loop for controlling engine power output, said feedback loop having a loop gain as a function of the transmission ration, said apparatus including a look up table for storing the loop gain, said look up table being addressed by transmission ratio and engine speed.

12. An apparatus as claimed in claim 10, in which the engine is an internal combustion engine and the output power is controlled by varying the ignition timing of the engine.

13. An apparatus for damping shunt of a vehicle powered by an engine, said apparatus comprising a differentiator and a non-linear transfer element arranged within a feedback loop for controlling engine power output, said non-linear transfer element having an input and an output and being arranged such that for a first input value, a gradient of an output value is a first gradient value and for a second input value the gradient of the output value is a second gradient value, the magnitude of the first gradient value being smaller than the magnitude of the second gradient value when the magnitude of the first input value is less than the magnitude of the second input value, and both gradient values being non-zero.

14. An apparatus as claimed in claim 13, in which said non-linear element has a quadratic transfer function.

15. An apparatus as claimed in claim 13, in which the engine is an internal combustion engine, the output power of which is controlled by varying an ignition timing of the engine, said non-linear transfer element being arranged such that the input value equals the output value at a maximum permissible level of spark advance.

16. An apparatus for damping shunt of a vehicle powered by an engine, said apparatus comprising a filter and an engine output power controller responsive to said filter, said filter being arranged to filter an engine demand signal and to attenuate the engine throttle demand signal below a first frequency.

17. An apparatus as claimed in claim 16, in which said filter is a band pass filter.

18. An apparatus as claimed in claim 16, in which the engine demand signal is derived from one of throttle position, accelerator pedal position and manifold pressure of the engine.

19. An apparatus as claimed in claim 16, in which the engine is an internal combustion engine and the engine output power controller is arranged to vary the ignition timing of the engine.

20. An apparatus as claimed in claim 16, in which the vehicle has a transmission having first and second transmission ratios, said apparatus further comprising a variable gain device arranged to amplify the engine demand signal, said variable gain device having a gain as a function of the transmission ratio of the transmission.

21. An apparatus for damping shunt in a vehicle powered by an engine via a transmission, said apparatus comprising an amplifier having an output for amplifying an engine demand signal and an engine output power controller responsive to the output of said amplifier for controlling engine output power, a gain of said amplifier being a function of a transmission ratio of the transmission.

22. An apparatus for damping shunt in a vehicle powered by an engine via a transmission, said apparatus comprising an amplifier having an output for amplifying an engine demand signal, an engine output power controller responsive to the output of said amplifier for controlling engine output power, and a high pass filter for filtering the engine demand signal, a gain of said amplifier being a function of a transmission ratio of the transmission.

23. An apparatus as claimed in claim 21, in which the engine is an internal combustion engine and the engine output power controller is arranged to control engine output power by adjusting an ignition timing of the engine.

24. An apparatus for damping shunt of a vehicle powered by an engine via a transmission having at least first and second transmission ratios, said apparatus comprising at least two features selected from a list consisting of:

a differentiator and a band pass filter arranged in a feedback loop for controlling engine power output, said band pass filter having a high frequency cut-off characteristic greater than first order;

a differentiator within a feedback loop for controlling engine power output, the feedback loop having a loop gain which is a function of transmission ratio;

a differentiator and a non-linear transfer element arranged within a feedback loop for controlling engine power output, said non-linear transfer element having an input and an output and being arranged such that for a first input value, a gradient of an output value is a first gradient value and for a second input value a gradient of the output is a second output value, the magnitude of the first gradient value being smaller than the magnitude of the second gradient value when the magnitude of the first input value is less than the magnitude of the second input value, and both gradient values being non-zero;

a filter and an engine output power controller responsive to said filter for controlling engine output power, said filter being arranged to filter an engine demand signal and to attenuate the engine demand signal below a first frequency; and an amplifier having an output for amplifying an engine demand signal and an engine output power controller responsive to the output of said amplifier for controlling engine output power, a gain of said amplifier being a function of a transmission ratio of the transmission.

* * * * *

UNITED STATES PATENT AND TRADEMARK OFFICE
CERTIFICATE OF CORRECTION

PATENT NO. : 5,512,024
DATED : April 30, 1996
INVENTOR(S) : Anthony Burton, Andrew J.S. Williams, Andrew J. Kirk and Russell W. Jones.

It is certified that error appears in the above-indentified patent and that said Letters Patent is hereby corrected as shown below:

On the title page, item

73 Assignee: "Lucas Industries" should read

—Lucas Industries public limited company —.

Signed and Sealed this

Sixth Day of August, 1996

Attest:

BRUCE LEHMAN

Attesting Officer  Commissioner of Patents and Trademarks